3,367,123
PREPARING POTABLE WATER FROM BRINE BY CHILLED PARTICULATE MATERIAL CONTACT
William P. Schambra, Midland, Mich., assignor to The Dow Chemical Company, Midland, Mich., a corporation of Delaware
Filed Feb. 3, 1966, Ser. No. 524,946
5 Claims. (Cl. 62—58)

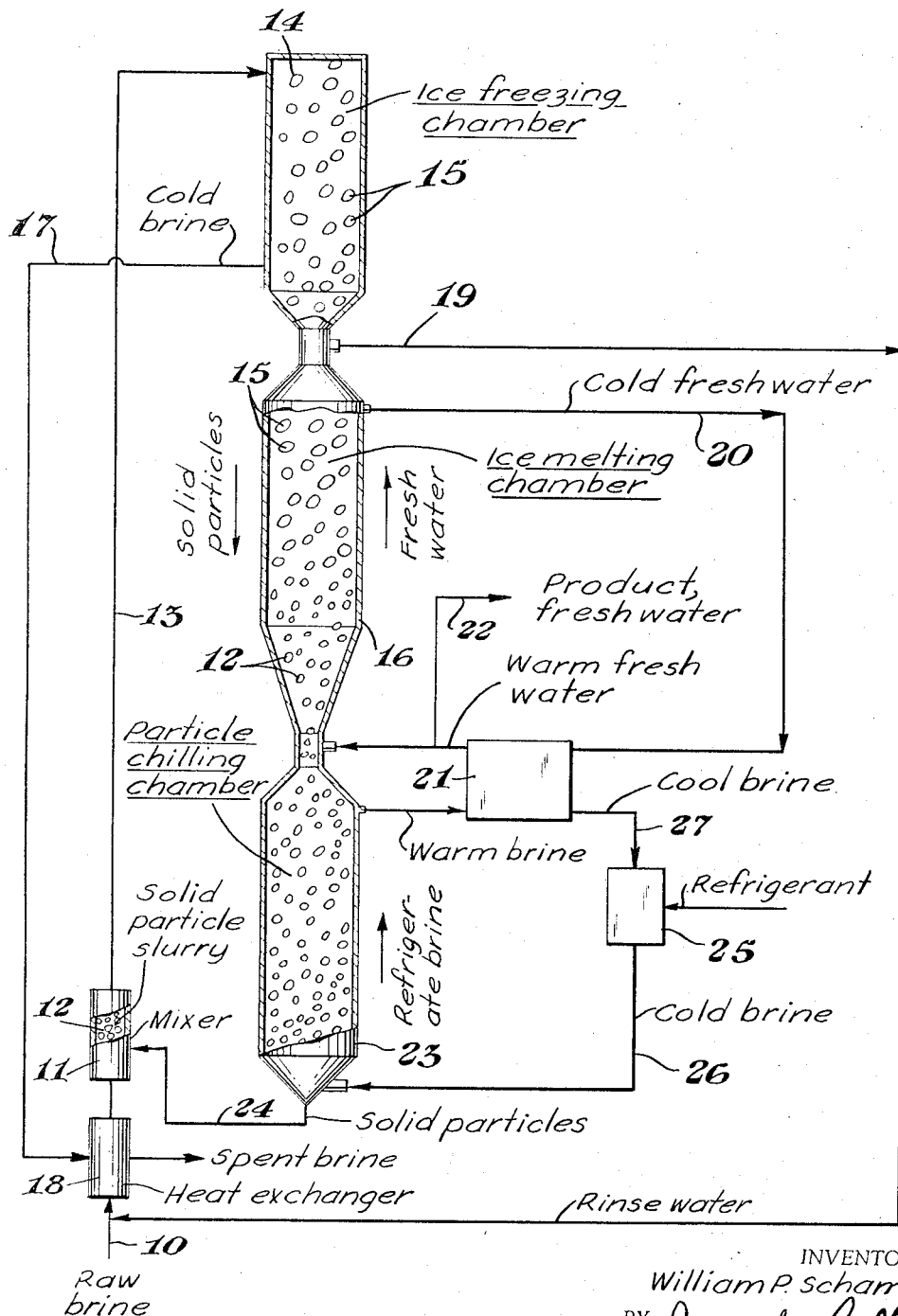

ABSTRACT OF THE DISCLOSURE

Chilled particulate solid material fractionally freezes thereon the aqueous component of brine solutions, the frost being removed subsequently as potable water by contact with relatively warm fresh water.

---

This invention relates to a process for preparing potable water from brines and more particularly relates to a process for producing potable water from naturally occurring brines by an improved freezing method.

In the past, processes have been developed for separating fresh potable water from brines by freezing out a portion of the fresh water and filtering to remove the residual more concentrated brine from the ice crystals. Such processes usually involved expanding a refrigerant gas directly in the brine or flash evaporation of a portion of the brine to reduce its temperature and cause ice crystals to form. In the known processes, such crystals form as a porous mush similar to snow flakes, which float on the brine and must be separated from both the brine and the refrigerant. The porous nature of the finely divided ice crystals formed in this manner causes occlusion and entrainment of brine within the ice thereby lowering the purity of product water. In processes where the direct injection of refrigerant is employed, the refrigerant contaminates the ice and imparts undesirable odor and taste to the finished product requiring special and expensive treatment steps to produce potable water.

It is an object of this invention to provide a process whereby fresh potable water may be produced from brines. Another object is to provide a process whereby an improved method is employed for freezing fresh water from brines wherein a minimum of brine is occluded or entrained in the fresh water. Another object is to provide a process whereby no direct contact is made between the refrigerant and the brine from which the potable water is to be derived. Another object is to provide a process in which solid particles and fluids are handled by well known techniques utilizing fluid dynamics, counter current contact and gravity separation of solids from fluids. These and other objects and advantages of the present process will become obvious from a reading of the following detailed description.

The figure is a diagrammatic representation of a continuous method of operation of the process of the invention.

It has now been discovered that an improved process capable of continuous operation is provided by cooling solid particles which are substantially heavier than brine to a temperature below the freezing point of water, contacting such cooled particles with the brine to be purified for a period such that a coating of ice forms on such particles, separating the ice-coated particles from the brine solution, washing the ice-coated particles with relatively warm fresh water to remove the ice therefrom and recooling and recirculating the solid particles. Such a process may be operated as a single vertical column which may be operated as a continuous flow system and which does not require filtration or centrifugation for separation of the fresh water ice from the brine.

As used herein, the term "brine" refers to the naturally occurring saline waters wherein sodium chloride is a major solute. These include sea water, brackish water resulting from sea water intrusion into fresh water, estuarial water where fresh and sea water are mixed, inland brackish surface or well waters, dilute sub-surface brines such as those produced from oil wells, and the like.

Referring to the drawing which indicates a preferred embodiment of the invention, a brine, such as sea water, is fed at or near room temperature, e.g. 60 to 75° F., through line 10, through one side of heat exchanger 18, and into a mixing vessel 11 where it is mixed with and entrains a quantity of solid particles 12, such as coarse sand or fine gravel, which are at a temperature below the freezing point of water. This slurry or mixture of brine and cold solid particles passes through line 13 to an insulated ice freezing zone or chamber 14. During passage through line 13 and ice freezing zone 14, water from the brine freezes as a dense coating, ordinarily in layers, on the surface of the cold particles 12 forming larger dense composite particles 15. Such composite particles 15 gravity flow from freezing chamber 14 into the adjacent melting chamber 16. Cold spent brine is removed from the bottom of the freezing chamber 14, passes through line 17, through one side of heat exchanger 18 and is discarded. As the ice coated solid particles 15 pass downwardly through the ice melting chamber 16, relatively warm fresh water passes upward countercurrently from the bottom of such chamber in contact with the ice coated particles 15 and is withdrawn from two points near the top of such ice melting chamber 16. At the top of such chamber 16, a portion of the water is removed as rinse water through line 19. The rinse water in the upper end of the chamber is relatively cold and contains small amounts of brine because of contact with the brine near the bottom of ice freezing chamber 14 where an interface is formed between the brine and the fresh water. It is therefore passed through line 19 and into line 10 to mix with the incoming brine and pass through heat exchanger 18 where the temperature of the feed brine is reduced. Near the top of the ice melting chamber but below the rinse water line 19, the cold fresh water is removed through line 20. The cold fresh water passes through one side of a heat exchanger 21, where its temperature is raised. A portion of such fresh water is removed as product through line 22 and the remainder is fed as relatively warm fresh water to the bottom of the ice melting chamber 16. The ice is melted from the composite particles 15 as they pass through the relatively warm fresh water in the ice melting chamber 16. Such particles then descend by gravity into the particle chilling chamber 23 containing refrigerated brine at a temperature below the freezing point of water and wherein the particles are chilled. The cold solid particles pass from the particle chilling chamber 23 through line 24 to mixing vessel 11 where they are again mixed with incoming feed brine. A relatively concentrated brine is empolyed in the particle chilling chamber 23 to cool the solid particles to below the freezing point of water. This concentrated brine is cooled by passing it through a heat exchange-type refrigeration unit 25, passing the chilled brine into the particle chilling chamber 23 through line 26 and passing upward through such chamber. The brine is warmed by contact with the solid particles and such warmed brine is removed from the particle chilling chamber 23 through line 27 and passed into the refrigeration unit 25.

The solid particles useful in the process of this invention include particles of any solid material whose density is substantially above that of water and which is water-insoluble and non-reactive with the brines to be treated. Likewise, the shape of such particles is not critical. They may be irregular, round, oval and the like but a shape which approaches spherical is advantageous. Illustrative of suitable solid particles are coarse sand, steel or other metal balls, small pebbles, ceramic balls and the like. Such solid particles are preferably non-porous, have a particle size of between about 20 mesh and 1 mesh (Standard Sieve size) and have a density of at least 1.2.

When such solid particles are cooled to a temperature below the freezing point of pure water and contacted with the brine solution, one or more layers of ice form on such particles in relatively pure dense form such as the layers of ice whch form a hailstone. Such ice layers are less porous than snow flake-type ice crystals, and therefore do not tend to entrain or occlude brine as mushy ice crystals do.

The composite particles formed by layers of ice surrounding the solid particles are easily separated from the spent brine by gravity. Separations employing filtration, decantation, centrifugation and the like may be employed, if desired, but ordinarily settling by gravity suffices.

Once separated from the spent brine, the ice coating on the solid particles is melted by contact with relatively warm fresh water, such water being above 32° F. and preferably between about 40° F. to about 70° F. The relatively heavy solid particles are then easily separated from the fresh water and transferred to a zone where they are again cooled to below the freezing point of water. It is generally desirable to cool such particles to a temperature of between about 20° F. and 25° F. prior to contacting such cooled solid particles with the feed brine from which fresh water is to be extracted. A preferred method for cooling the solid particles is to contact them with a relatively concentrated brine solution which is refrigerated to the desired temperature by heat exchange means so there is no contamination of either the brine or the solid particles by the refrigerant. The brine is preferably at a temperature of between about 15° F. and about 20° F. when contacted with such particles and preferably is sufficiently concentrated to have a freezing point of less than about 10° F.

The process of this invention provides a continuous process whereby fresh potable water may be removed from brines with a minimum of entrainment or occlusion of brine. Such process may be easily conducted in relatively simple equipment to thereby provide an improved, efficient and economic process for producing fresh potable water from brines otherwise having little or no value or utility.

Various modifications can be made in the present invention without departing from the spirit or scope thereof for it is understood that I limit myself only as defined in the appended claims.

I claim:

1. A process for preparing fresh potable water from brine which comprises contacting a brine with cold solid particles at a temperature below the freezing point of water, removing water from said brine as a dense coating of ice on said solid particles, separating the ice-coated solid particles from the residual brine, contacting said ice-coated solid particles with relatively warm potable water to remove the ice coating therefrom as potable water, separating said solid particles from said potable water, recooling said solid particles to a temperature below the freezing point of water and repeating the operation on a cyclic basis.

2. The process of claim 1 wherein the brine is sea water.

3. The process of claim 1 wherein the solid particles are fine gravel.

4. The process of claim 1 wherein brine is contacted with solid particles at a temperature of between about 20° F. and 25° F.

5. The process of claim 1 wherein the solid particles are cooled to below the freezing point of water by contact with a relatively concentrated brine having a temperature between about 15° F. and 20° F.

References Cited

UNITED STATES PATENTS

| | | | |
|---|---|---|---|
| 2,579,421 | 12/1951 | Egan | 62—58 |
| 2,666,304 | 1/1954 | Ahrel | 62—58 |
| 2,968,164 | 1/1961 | Hanson | 62—58 |
| 2,896,419 | 7/1959 | Thompson | 62—58 |
| 3,170,778 | 2/1965 | Roth | 62—58 |
| 3,251,192 | 5/1966 | Rich | 62—58 |

NORMAN YUDKOFF, *Primary Examiner.*